(12) United States Patent
Mosch et al.

(10) Patent No.: US 11,668,337 B2
(45) Date of Patent: Jun. 6, 2023

(54) TOLERANCE COMPENSATION DEVICE

(71) Applicant: WITTE Automotive GmbH, Velbert (DE)

(72) Inventors: Gerhard Mosch, Duisburg (DE); Klaus Spickenheier, Iserlohn (DE); Vladimir Radanovic, Cologne (DE)

(73) Assignee: WITTE Automotive GmbH, Velbert (DE)

( * ) Notice: Subject to any disclaimer, the term of this patent is extended or adjusted under 35 U.S.C. 154(b) by 477 days.

(21) Appl. No.: 16/847,747

(22) Filed: Apr. 14, 2020

(65) Prior Publication Data

US 2020/0332825 A1 Oct. 22, 2020

(30) Foreign Application Priority Data

Apr. 17, 2019 (DE) .......................... 102019110201.4

(51) Int. Cl.
*F16B 5/02* (2006.01)
*F16B 37/12* (2006.01)

(52) U.S. Cl.
CPC ............ *F16B 37/12* (2013.01); *F16B 5/0233* (2013.01)

(58) Field of Classification Search
CPC ... F16B 5/0283; F16B 5/0233; F16B 25/0068
USPC ......................................... 411/535, 546, 412
See application file for complete search history.

(56) References Cited

U.S. PATENT DOCUMENTS

| | | | | |
|---|---|---|---|---|
| 4,662,807 A * | 5/1987 | Lien | ...................... | F16B 5/0283 411/389 |
| 4,846,622 A * | 7/1989 | Lien | ...................... | E06B 1/6076 411/389 |
| 6,669,425 B1 * | 12/2003 | Preta | ...................... | F16B 5/0275 411/453 |
| 6,688,823 B2 * | 2/2004 | Kakamu | ............... | F16B 5/0233 411/352 |
| 6,826,878 B1 * | 12/2004 | Rovtar | .................. | E06B 1/6076 411/383 |
| 8,439,456 B2 * | 5/2013 | Kiechle | ................ | F16B 5/0233 411/546 |
| 9,302,716 B2 * | 4/2016 | Sahi | ...................... | F16B 5/0635 |
| 11,047,410 B1 * | 6/2021 | Reed, Sr. | ............ | F16B 23/0069 |
| 2008/0152460 A1 * | 6/2008 | Watanabe | ............... | F16B 33/02 411/412 |
| 2021/0396253 A1 * | 12/2021 | Heinrichs | ............. | F16B 5/0233 |
| 2022/0065281 A1 * | 3/2022 | Hagen | ................ | F16B 23/0084 |

FOREIGN PATENT DOCUMENTS

| | | |
|---|---|---|
| DE | 102010018471 A1 | 11/2011 |
| DE | 202016105286 U1 | 1/2018 |

OTHER PUBLICATIONS

German Patent and Trade Mark Office, Search Report for patent application No. 102019110201.4, dated Feb. 11, 2020.

* cited by examiner

*Primary Examiner* — Flemming Saether
(74) *Attorney, Agent, or Firm* — Wiggin and Dana LLP

(57) ABSTRACT

The invention relates to a device for compensating tolerances between a first component and a second component to be screwed to it by means of a connecting screw, comprising a base element and a compensation element that is in thread engagement with the base element, the thread engagement being non-self-locking in such a way that the compensation element moves out of the base element when the connecting screw exerts an axial force on the compensation element.

17 Claims, 3 Drawing Sheets

TOLERANCE COMPENSATION DEVICE

FIELD OF THE INVENTION

The invention relates to a device for compensating tolerances between a first component and a second component to be screwed to it by means of a connecting screw, comprising a base element and a compensation element that is in threaded engagement with the base element.

BACKGROUND

In a known tolerance compensation device of this type, the base element and the compensation element are formed by metallic threaded sleeves which engage in a left-hand thread. A spring element is arranged in the compensation element, which produces a frictional connection between the connecting screw which is passed through the tolerance compensation device and has a right-hand thread and the compensation element, so that when the connecting screw is tightened a torque is exerted on the compensation element which prevents the compensation element from being unscrewed from the base element against the direction of insertion of the connecting screw.

SUMMARY OF THE INVENTION

The object of the invention is to provide a less expensive tolerance compensation device.

The object is achieved by a device with the features of claim 1 and in particular in that the thread engagement between the base element and the compensation element is so non-self-locking that the compensation element moves out of the base element in an insertion direction of the connecting screw when the connecting screw exerts an axial force acting in the insertion direction on the compensation element.

Due to the non-self-locking design of the threads of the base element and the compensation element, a mere axial force, for example exerted by the connecting screw, is sufficient to unscrew the compensation element from the base element. In other words, the non-self-locking thread engagement ensures the conversion of a longitudinal movement, for example caused by the advancement of the connecting screw, into a rotary movement, namely the compensation element.

In contrast to the known tolerance compensation device, the compensation element according to the invention is therefore not moved out of the base element against the direction of insertion of the connecting screw, but in the direction of insertion of the connecting screw. In this context, the direction in which the connecting screw is inserted is the direction in which the connecting screw is inserted into or inserted through the tolerance compensation device, in particular in order to be brought into engagement with an associated nut element for screwing the first and second components. It goes without saying that the tolerance compensation device must be configured to insert or push through the connecting screw and, for example, can form a corresponding passage for the connecting screw.

Since no torque needs to be transmitted from the connecting screw to the compensation element in the tolerance compensation device according to the invention, a spring element is also not required to produce a frictional connection between the connecting screw and compensation element. As already mentioned, according to the invention it is sufficient for the compensation element to move out of the base element to exert an axial force on the compensation element. This can happen, for example, in that a head of the connecting screw is brought into contact with the compensation element when it is pushed through the tolerance compensation device and entrains it.

Advantageous embodiments of the invention can be found in the dependent claims, the description and the drawing.

According to one embodiment, the base element and the compensation element each form a steep thread. In this way, a non-self-locking thread engagement can be implemented in a particularly simple manner.

A particularly simple and compact design is achieved if the base element forms an internal thread and the compensation element forms an external thread. In principle, however, a reverse embodiment would also be conceivable, in which the internal thread is provided on the compensation element and the external thread on the base element.

According to a further embodiment, the base element forms two mutually opposite thread sections. To minimize friction losses in the thread, the thread sections preferably have the same pitches. The restriction to two thread sections contributes to a more economical manufacture of the tolerance compensation device, since no complete thread has to be cut into the base element.

According to a further embodiment, the compensation element forms a multi-start thread. This preferably comprises a plurality of groups of thread sections arranged parallel to one another and distributed in the circumferential direction. Similar to the case of the base element, this also contributes to a more economical manufacture of the tolerance compensation device.

According to a further embodiment, the compensation element forms a contact surface for a head of the connecting screw. The connecting screw can not only exert an axial force required to move the compensation element out of the base element onto the compensation element via this contact surface, but also the compensation element can also be clamped to the second component.

According to a further particularly simple and compact design, the compensation element is cup-shaped. For example, the compensation element can comprise a hollow cylindrical section, which at its end, in particular at its end facing the second component, merges into a bottom section which forms a passage for the connecting screw and defines a contact surface for the head of the connecting screw.

According to a further embodiment, the compensation element is composed of at least two, in particular at least partially hollow, cylindrical segments which are axially displaceable relative to one another. For example, these segments can be hollow cylinder halves. Furthermore, the segments can be connected to one another in a material-locking or form-locking and/or non-positive manner by means of connecting elements. For example, the connecting elements can comprise spring elements, in particular spring elements formed in one piece with the segments. Alternatively, the segments can be clipped together. It goes without saying that corresponding clips and clip receptacles must be provided on the segments for this purpose.

In an initial or idle state of the compensation element, the segments are preferably held axially offset from one another by the connecting elements. Ideally, the thread sections of one segment and the thread sections of the other segment are arranged in such a way that they form the desired thread of the compensation element in the initial or idle state of the compensation element, that is to say when the segments are axially offset from one another, in order to ensure a thread engagement between compensation element and base element which is as frictionless as possible. Only when the connecting screw is tightened and the compensation element is clamped to the second component are the segments aligned with one another and the corresponding threaded parts shifted relative to one another, as a result of which a play required for moving the compensation element out of the base element is removed from the non-self-locking thread engagement, so that to a certain extent tolerances in the thread engagement are also compensated.

The compensation element is advantageously formed from a plastic material and in particular an injection-molded part. Alternatively or additionally, the base element can also be formed from a plastic material and in particular can be an injection-molded part.

According to a further embodiment, the base element is formed by the first component, for example in that corresponding thread sections are provided in a bore in the first component. The tolerance compensation device enables a more versatile and economical use, however, if the base element is a separate component which, if necessary, is attached to the first component, for example clipped, pressed, glued or welded into it.

BRIEF DESCRIPTION OF THE DRAWINGS

The invention is described below purely by way of example using a possible embodiment with reference to the accompanying drawing. In the drawings.

DETAILED DESCRIPTION OF THE DRAWINGS

Figure 1:
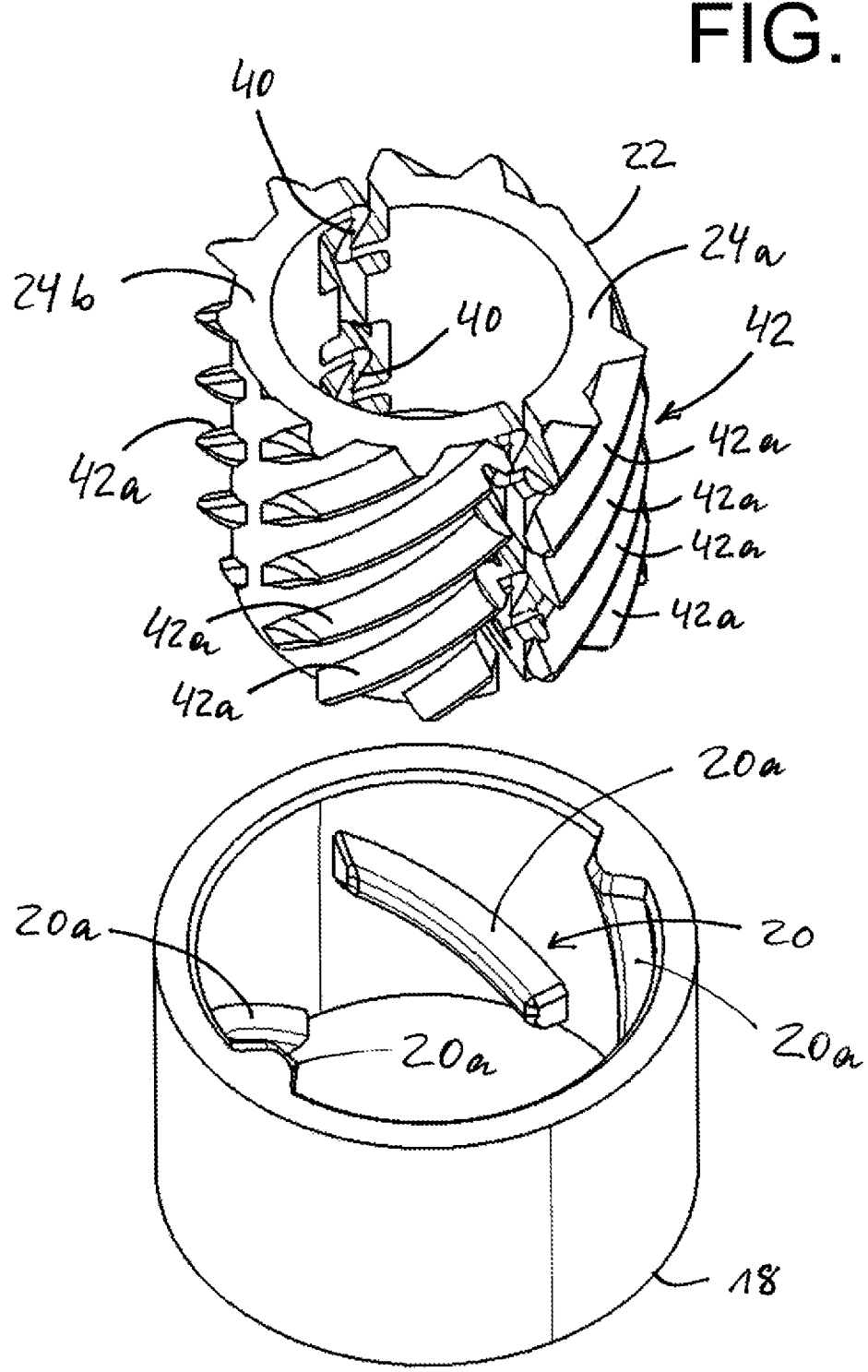
FIG. 1 shows a perspective view of a compensation element and a base element of a tolerance compensation device according to the invention.

In the figures, a tolerance compensation device for bridging a gap 10 between two components 12, 14 to be screwed together by means of a connecting screw 16 is shown. One component 12, hereinafter referred to as first component 12, can be, for example, a bearing bracket for an outside door handle of a motor vehicle, while the other component 14, hereinafter referred to as second component 14, can be formed by a support structure of the motor vehicle.

Figure 3:
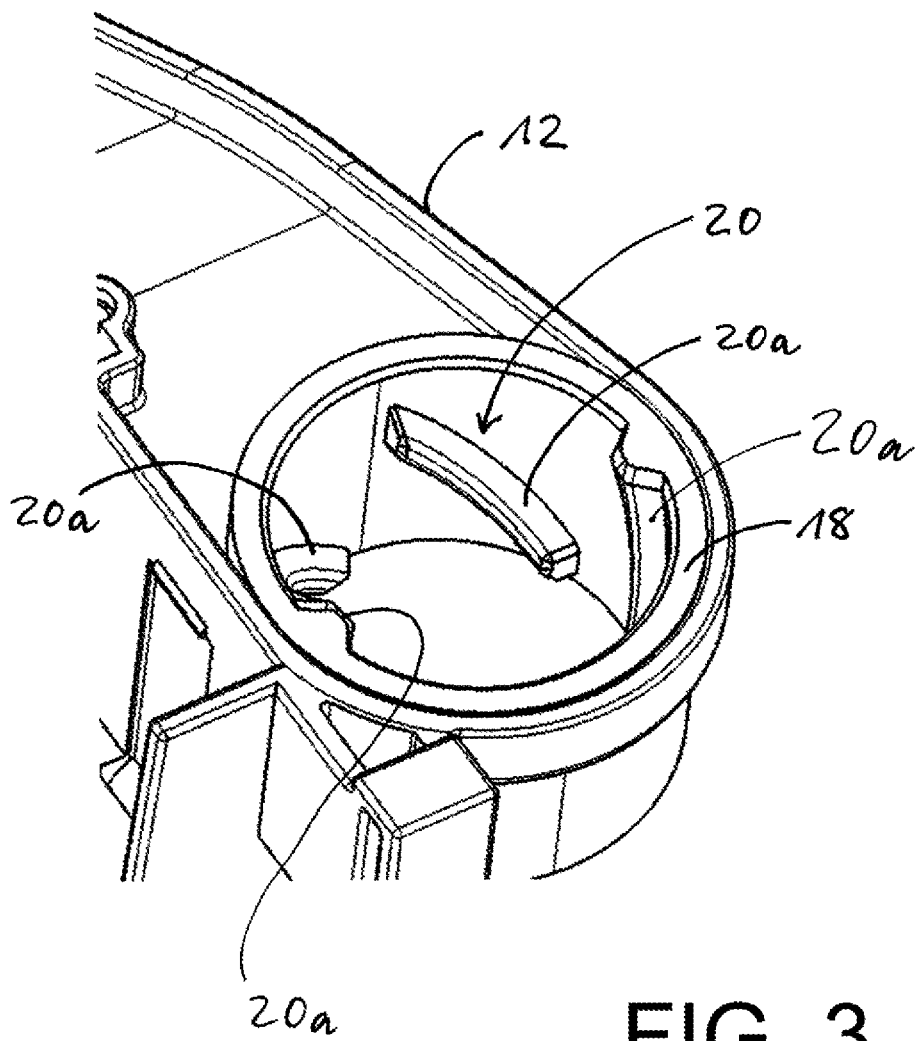
FIG. 3 shows a perspective view of a base element which is integrally formed with a first component.

The tolerance compensation device comprises a hollow cylindrical base element 18 which can be firmly connected to the first component 12, for example clipped, pressed, glued or welded into it. The base element 18 shown in FIG. 1 is a plastic part produced by means of an injection molding process. Alternatively, the base element 18 can also be formed in one piece with the first component 12, as shown in FIG. 3. In this case too, the base element 18 can be formed as part of the component 12 made of plastic, for example by means of an injection molding process.

The base element 18 has an internal thread 20, which, however, is not continuous but is formed by a plurality of, in the present exemplary embodiment four, thread sections 20a evenly distributed in the circumferential direction. All thread sections 20a have the same pitch, which is chosen so large that the thread of the base element 18 forms a steep thread.

The tolerance compensation device further comprises a compensation element 22 which can be screwed into the base element 18 and which, like the base element 18, can be formed from a plastic material, for example by means of an injection molding process.

The compensation element 22 is cup-shaped. Specifically, the compensation element 22 has a hollow cylindrical section 24, which at its end facing the second component 14 merges into a bottom section 26.

The bottom section 26 defines a central axial passage 28 for the connecting screw 16 and a contact surface 30 adjacent to the passage 28 for a head 32 of the connecting screw 16. In principle, it is conceivable to choose a diameter of the passage 28 that is minimally larger than an outer diameter of a shaft 34 of the connecting screw 16, so that the head 32 of the connecting screw 16 can come into direct contact with the contact surface 30. In order to be able to better compensate for radial tolerances, the diameter of the passage 28 in the present exemplary embodiment is even selected to be larger than an outer diameter of the head 32 of the connecting screw 16, so that a suitable washer 36 must be arranged between the head 32 of the connecting screw 16 and the bottom section 26 of the compensation element 22 to prevent the head 32 from entering the passage 28. In this case, the head 32 of the connecting screw 16 in the final assembly state (FIG. 2B) only indirectly, namely via the washer 36, abuts against the contact surface 30 of the compensation element 22.

The compensation element 22 is composed of two segments, here in the form of hollow cylinder halves 24a, 24b, which are connected to one another by connecting elements, specifically by two pairs of spring elements 40, each axially spaced apart. Each spring element 40 is formed by a web which is angled twice in such a way that it gives the spring element 40 a Z-shape. In an initial or idle state of the compensation element 22, the hollow cylinder halves 24a, 24b are arranged axially offset from one another such that a bottom half 26a formed on one hollow cylinder half 24a and a bottom half 26b formed on the other hollow cylinder half 24b do not lie in one plane, but have an certain axial offset relative to each other (FIG. 2A).

On the outside of the compensation element 22, four groups of thread sections 42a, each running parallel to one another, are formed in the circumferential direction, two groups of thread sections 42a being provided on each hollow cylinder half 24a, 24b. In the initial or idle state of the compensation element 22 shown in FIG. 2A, the thread sections 42a are aligned such that they form a multi-start external thread 42 of the compensation element 22. The pitch of the external thread 42 of the compensation element 22 is adapted to the pitch of the internal thread 20 of the base element 18, that is to say the external thread 42 of the compensation element 22 also forms a steep thread, so that the thread engagement of the base element 18 and compensation element 22 is not self-locking.

If the first member 12 is to be screwed to the second component 14, then the first component 12 is arranged together with the tolerance compensation device, that is with the base element 18 and the screwed-in compensation element 22 on the second component 14. Next, the connecting screw 16 together with the washer 36 is inserted into the tolerance compensation device in an insertion direction, from above in FIGS. 2A and 2B, and is screwed into a nut element 48 through the passage 28 of the compensation element 22 and through a bore 46 of the second component 14.

Figure 2A:
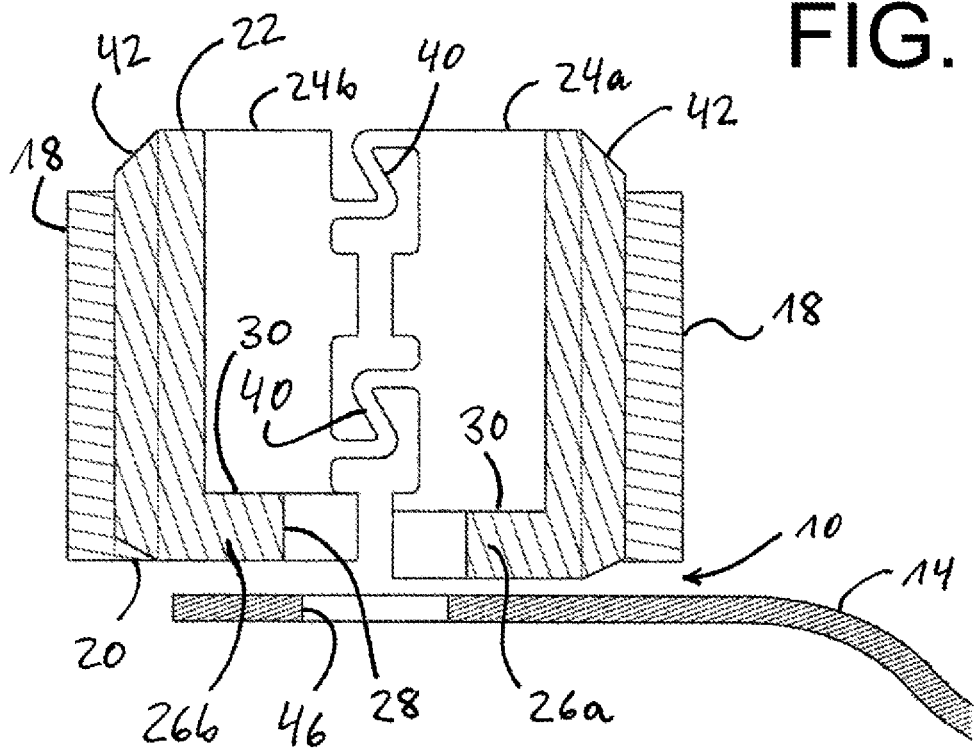
FIG. 2A shows a sectional view of the tolerance compensation device of FIG. 1 attached to a first component in a preassembly state.
Figure 2B:
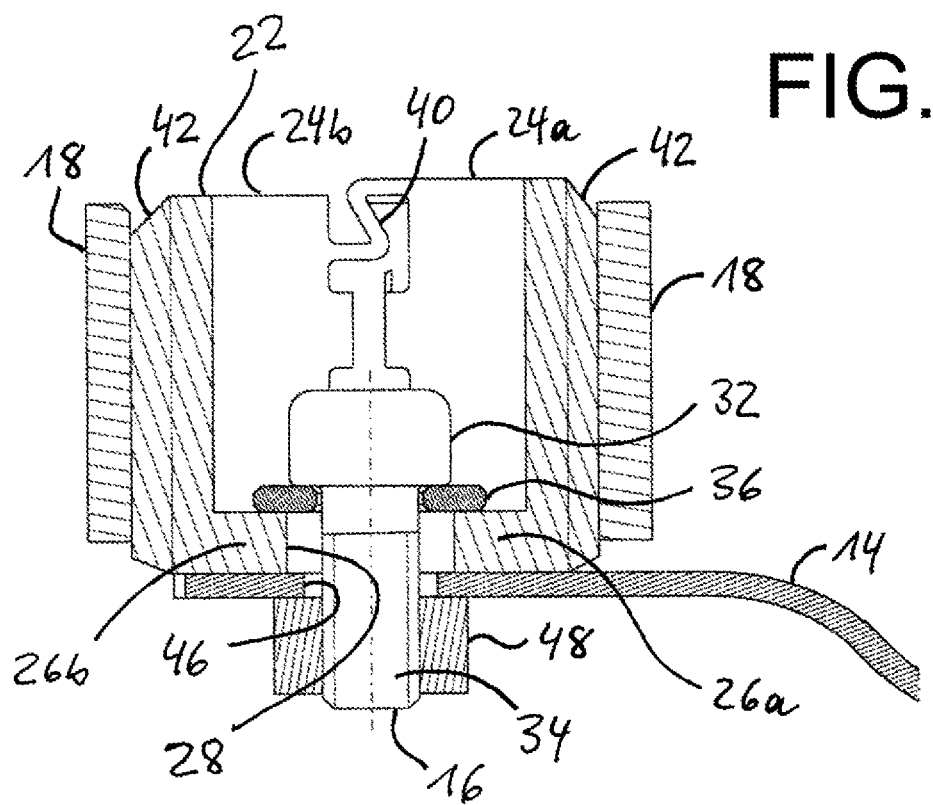
FIG. 2B shows the tolerance compensation device of FIG. 2A in a state mounted on a second component.

As soon as the head 32 of the connecting screw 16 comes into contact with the bottom section 26 of the compensation element 22 via the washer 36 and exerts an axial force acting in the insertion direction on the compensation element 22, this emerges from the base element 18, downwards in FIGS. 2A and 2B, until it abuts against the second component 14 (FIG. 2B). It goes without saying that the hollow cylinder half 24a initially closer to the second component 14, the right hollow cylinder half in FIGS. 2A and 2B, first comes into contact with the second component 14 and, when the connecting screw 16 is further tightened, the other hollow cylinder half 24b initially moved from the second component 14 is moved against the second component 14 until finally both bottom halves 26a, 26b are clamped between the washer 36 and the second component 14.

The axial displacement of the hollow cylinder halves 24a, 24b relative to one another causes the external thread 42 of the compensation element 22 to be braced in the internal thread 20 of the base element 18. This compensates for tolerances between the threads 20, 42 and eliminates play in the thread engagement between the base element 18 and the compensation element 22.

As a result, the tolerance compensation device thus ensures, in spite of possible structural tolerances, a play-free and reliable screwing of the first component 12 to the second component 14.

LIST OF REFERENCE NUMBERS 10 gap
12 first component
14 second component
16 connecting screw
18 base element
20 internal thread
20a thread section
22 compensation element
24 hollow cylindrical section
24a hollow cylinder half
24b hollow cylinder half
26 bottom section
26a bottom half
26b bottom half
28 passage
30 contact surface
32 screw head
34 shaft
36 washer
40 spring element
42 external thread
42a thread section
46 bore
48 nut element

What is claimed is:

1. Device for compensating tolerances between a first component and a second component to be screwed to it by means of a connecting screw, the device comprising a base element and a compensation element that is in threaded engagement with the base element, the compensation element including at least two segments which are axially displaceable relative to one another and are connected to one another by connecting elements with a material fit, form fit, or force fit, the segments being held axially offset from one another by the connecting elements in an initial or idle state of the compensation element;
the threaded engagement between the base element and the compensation element being non-self-locking in such a way that the compensation element moves out of the base element in an insertion direction of the connecting screw when the connecting screw exerts an axial force acting in the insertion direction on the compensation element.

2. The device according to claim 1,
wherein the base element and the compensation element form a steep thread.

3. The device according to claim 1,
wherein the base element forms an internal thread and the compensation element forms an external thread.

4. The device according to claim 1,
wherein the base element forms two opposite thread sections.

5. The device according to claim 4,
wherein the base element forms two opposite thread sections with the same pitch.

6. The device according to claim 1,
wherein the compensation element forms a multi-start thread.

7. The device according to claim 6,
wherein the compensation element forms a multi-start thread which comprises a plurality of groups distributed in the circumferential direction with each of the thread sections being arranged in parallel to one another.

8. The device according to claim 1,
wherein the compensation element forms a contact surface for a head of the connecting screw.

9. The device according to claim 1,
wherein the compensation element is cup-shaped.

10. The device according to claim 1,
wherein the compensation element comprises a hollow cylindrical section which at its one end merges into a bottom section which has a passage for the connecting screw and defines a contact surface for a head of the connecting screw.

11. The device according to claim 10,
wherein the one end is its end facing the second component.

12. The device according to claim 1,
wherein at least two segments are at least approximately partially hollow cylindrical segments.

13. The device according to claim 1,
wherein the connecting elements comprise spring elements.

14. The device according to claim 13,
wherein the spring elements are spring elements formed in one piece with the segments.

15. The device according to claim 1,
wherein thread sections of the one segment and thread sections of the other segment are arranged such that they together form the thread of the compensation element when the compensation element is in its initial or idle state.

16. The device according to claim 1,
wherein the compensation element is formed from a plastic material and/or wherein the compensation element is formed from a plastic material and is an injection molded part; and/or
wherein the base element is formed from a plastic material and/or the base element is formed from a plastic material and is an injection molded part.

17. The device according to claim 1,
wherein the base element is formed by the first component or is firmly connected to the first component.

* * * * *